United States Patent
Van Endert et al.

(10) Patent No.: US 7,570,549 B2
(45) Date of Patent: Aug. 4, 2009

(54) SYSTEM AND METHOD FOR EFFICIENTLY TIMING RECALIBRATION PROCEDURES IN A DISC DRIVE APPARATUS

(75) Inventors: Tony Petrus Van Endert, Eindhoven (NL); Antonius Jacobus Josephus Van Den Hoogen, Eindhoven (NL); Bart Franco, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 524 days.

(21) Appl. No.: 10/557,964

(22) PCT Filed: May 12, 2004

(86) PCT No.: PCT/IB2004/050660

§ 371 (c)(1),
(2), (4) Date: Nov. 17, 2005

(87) PCT Pub. No.: WO2004/102566

PCT Pub. Date: Nov. 25, 2004

(65) Prior Publication Data

US 2006/0221792 A1    Oct. 5, 2006

(30) Foreign Application Priority Data

May 19, 2003    (EP) .................................. 03101405

(51) Int. Cl.
*G11B 7/00*    (2006.01)
(52) U.S. Cl. ............... 369/44.27; 369/53.45; 369/47.55
(58) Field of Classification Search ............. 369/44.27, 369/44.29, 47.55, 53.37, 53.45, 28.01
See application file for complete search history.

(56) References Cited

U.S. PATENT DOCUMENTS

| | | | | |
|---|---|---|---|---|
| 3,723,980 | A | * | 3/1973 | Gabor ..................... 360/78.12 |
| 5,072,435 | A |  | 12/1991 | Bakx |
| 5,084,791 | A | * | 1/1992 | Thanos et al. ............ 360/77.04 |
| 5,134,602 | A |  | 7/1992 | Baca et al. |
| 5,408,365 | A | * | 4/1995 | Van Doorn et al. ............ 360/46 |
| 5,412,519 | A |  | 5/1995 | Buettner et al. |
| 5,455,717 | A | * | 10/1995 | Van Doorn et al. ............. 360/6 |
| 6,266,203 | B1 | * | 7/2001 | Street et al. .................. 360/69 |
| 6,317,405 | B1 | * | 11/2001 | Arai ........................... 369/116 |
| 6,356,515 | B1 | * | 3/2002 | Kumita et al. ............ 369/13.26 |
| 6,697,310 | B1 | * | 2/2004 | Kuriuzawa et al. ....... 369/53.11 |
| 2002/0110065 | A1 |  | 8/2002 | Wang et al. |

FOREIGN PATENT DOCUMENTS

GB    2184869 A    7/1987
JP    08180621    7/1996

OTHER PUBLICATIONS

ISR: PCT/IB2004/050660.
Written Opinion: PCT/IB2004/050660.
"Write-Recalibration in Single-and Dual-Headed Optical Disk Drives", IBM Tech. Disclosure Bulletin, vol. 34, No. 9, Feb. 1992, Armonk, NY, p. 70-71.

* cited by examiner

*Primary Examiner*—Ali Neyzari

(57) ABSTRACT

A disc drive apparatus (1) is described, for writing/reading information into/from a storage medium (2), such as an optical disc. After start-up, multiple recalibration processes are executed, wherein the recalibration processes are executed more frequently during an early phase of the write/read operation than during a later phase of the write/read operation.

32 Claims, 9 Drawing Sheets

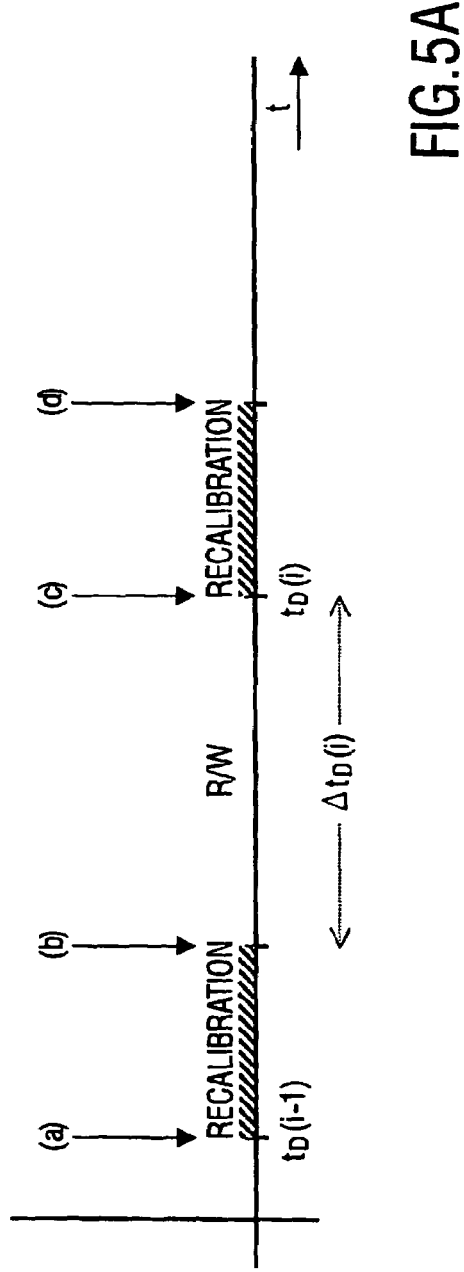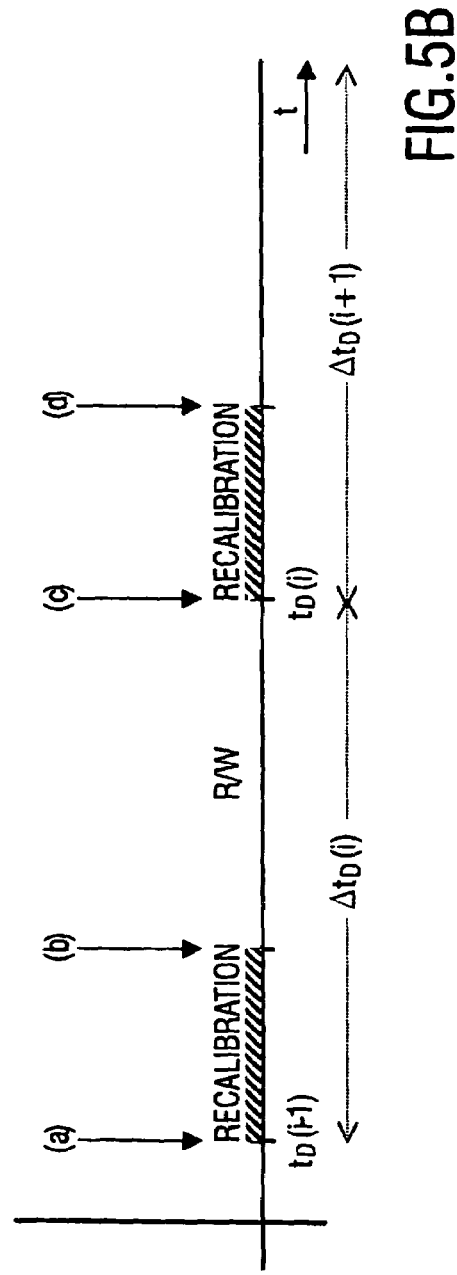

SYSTEM AND METHOD FOR EFFICIENTLY TIMING RECALIBRATION PROCEDURES IN A DISC DRIVE APPARATUS

FIELD OF THE INVENTION

The present invention relates in general to the art of storage devices such as optical storage discs. More particularly, the present invention relates in general to a disc drive apparatus for writing/reading information into/from an optical storage disc; hereinafter, such disc drive apparatus will also be indicated as "optical disc drive".

BACKGROUND OF THE INVENTION

As is commonly known, an optical storage disc comprises at least one track, either in the form of a continuous spiral or in the form of multiple concentric circles, of storage space where information may be stored in the form of a data pattern. Optical discs may be read-only type, where information is recorded during manufacturing, which information can only be read by a user. The optical storage disc may also be a writable type, where information may be stored by a user. For reading/writing information from/into the storage space of the optical storage disc, an optical disc drive comprises, on the one hand, rotating means for receiving and rotating an optical disc, and on the other hand optical means for generating an optical beam, typically a laser beam, and for scanning the storage track with said laser beam. Since the technology of optical discs in general, the way in which information can be stored in an optical disc, and the way in which optical data can be read from an optical disc, is commonly known, it is not necessary here to describe this technology in more detail.

In a disc drive, several operational parameters need to be calibrated, i.e. set to an optimal value for optimal performance. For example, a tilt angle of an optical lens is calibrated, a focus offset of an optical pickup unit is calibrated, a radial error amplitude is calibrated, etc. Particularly, in the case of a write operation, the optical write power is calibrated. Said parameters are commonly known to persons skilled in this art, as is the requirement for calibration. Further, calibration procedures for the above-mentioned and other parameters are known per se, and may be used in implementing the present invention. Therefore, a more detailed description of calibration procedures is not necessary here.

It is already known in practice to perform calibration procedures as part of a start-up procedure or initiation procedure, i.e. when a new disc is introduced in the disc drive, and/or when a new read/write command is given in respect of a disc already present in the drive. However, it may be that the parameter values as set during start-up calibration are no longer optimal values at a later stage of the read/write process. This may, for instance, be due to changing circumstances like changing temperature, changing read/write location on disc, etc. Therefore, it may be desirable to also perform calibration procedures at a later stage, when a write or read process is in progress. Such calibration procedures will be indicated by the phrase "recalibration", to make a distinction from calibration during the start-up phase.

An important aspect in recalibration is its timing. On the one hand, more frequent recalibration procedures may improve the signal quality, but it involves a reduction in data throughput. On the other hand, if recalibration procedures are performed not often enough, errors may occur. Further, recalibration procedures interrupt the write or read process which is in progress, so they could affect the proper data transfer.

SUMMARY OF THE INVENTION

The present invention relates specifically to the timing of recalibration.

It is a general objective of the present invention to provide a disc drive apparatus in which an optimal signal quality is maintained as much as possible.

It also is a general objective of the present invention to provide a disc drive apparatus in which the number of recalibration procedures performed is as few as possible.

It is a further general objective of the present invention to provide a disc drive apparatus in which recalibration procedures are performed as efficiently as possible, i.e. in which the timing of recalibration procedures for a certain parameter is determined in relation to a chance that this parameter actually needs to be recalibrated.

It is a specific objective of the present invention to provide a disc drive apparatus with a recalibration management facility which provides an efficient timing of recalibration procedures for parameters which are temperature-sensitive.

According to an important aspect of the present invention, at least in an early phase of a write or read operation, the recalibration timing is more frequent than in a later phase of the write or read operation. Or, the time intervals between successive recalibration timings may increase with the passing of time since the beginning of a write or read operation. Such change of successive recalibration timings is based on the insight that relatively large changes in temperature are expected during the first moments of a write or read operation, due to the warming-up of the laser system or the apparatus as a whole, whereas relatively little changes in temperature are expected during later moments of a write or read operation, because then the laser system or the apparatus as a whole will have (almost) reached a steady state.

In a specific embodiment, a recalibration due time is determined on the basis of the amount of time lapsed since a particular event. This particular event may be, for instance, the previous recalibration due time, or the start of the previous recalibration procedure, or the end of the previous recalibration procedure. Recalibration may start immediately at the recalibration due times, or after fulfillment of recalibration permission conditions. The time interval between said particular event and the next recalibration due time increases for subsequent recalibration due times.

In a specific embodiment, a disc drive apparatus comprises a data engine system and a data processing system. The data engine system provides an interface between disc drive apparatus and disc, as it handles all incoming and outgoing communication between disc drive and disc. The data processing system processes the data present in incoming and outgoing signals from and to the disc, respectively, and processes the data for communication to and from a host system such as a PC, respectively. The data engine system determines the recalibration due times, i.e. the moments in time when a recalibration is desirable. If the actual recalibration is postponed until fulfilment of recalibration permission conditions, it may be that the check for such conditions is done by the data processing system.

BRIEF DESCRIPTION OF THE DRAWINGS

These and other aspects, features and advantages of the present invention will be further explained by the following description of a preferred embodiment of the present invention with reference to the drawings, in which same reference numerals indicate same or similar parts, and in which:

FIGS. 5A and 5B are graphs illustrating the timing of the methods illustrated in FIGS. 4A and 4B, respectively;

DESCRIPTION OF THE INVENTION

Figure 1:
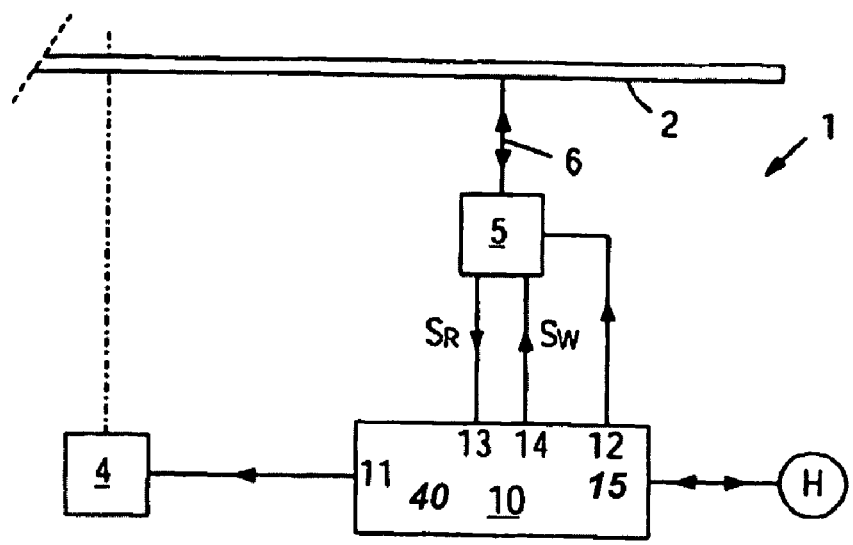
FIG. 1 schematically shows a block diagram illustrating relevant parts of a disc drive apparatus.

FIG. 1 schematically shows a diagram which illustrates some parts of a disc drive apparatus 1, capable of handling a disc 2. For instance, the disc 2 is an optical (including magneto-optical) disc, such as a CD, a DVD, etc. The disc drive 1 comprises a motor 4 for rotating the disc 2, and an optical pickup unit 5 for scanning tracks (not shown) of the disc 2 with an optical beam 6.

The disc drive 1 further comprises a control circuit 10, having a first output 11 for controlling the motor 4, and having a second output 12 for controlling the optical pickup unit 5. The control circuit 10 further has a data input port 13 and a data output port 14. In a reading mode, the data input port 13 receives a data read signal $S_R$ from the optical pickup unit 5. In a writing mode, the control circuit 10 provides a data write signal $S_W$ at its data output port 14. The control circuit 10 further has a data communication port 15 for data communication with a host system, generally indicated at H. The host system H may for instance be a PC or the like. The disc drive 1 may be separate from the host 1, communicating over a long-distance communication path, or it may be built-in in the host H.

When the disc drive 1 is started, for instance when a new disc 2 is introduced into the drive, a start-up procedure is executed, which includes a calibration procedure for certain parameters, as is known per se. Assume that the disc drive 1 is in a stand-by modus for some time, and its temperature is substantially equal to ambient temperature. When a read/write procedure is started, the temperature of the laser device and its immediate surroundings rises, and also the temperature of the disc drive apparatus as a whole rises. Some of the calibrated parameters are sensitive to temperature. Examples of temperature-sensitive parameters are focus-offset and optimal power control (OPC). OPC relates to the optimal laser power for performing a write operation: this optimal power depends inter alia on the temperature of the laser device. When the temperature within the housing of the disc drive apparatus rises, the exact shape of the optical path changes, so the focus-offset needs to be calibrated.

In this respect, it is noted that the rise in laser temperature is very fast after start of a write or read operation, or when switching from reading to writing: the time constant is in the order of approximately 1 to 2 minutes. During this relatively short period, laser power variations play a large role in the writing process. On the other hand, drifts in the focus offset are caused in the OPU by changes in temperature of the surroundings, which is a much slower process.

Thus, it is desirable to perform a recalibration of the temperature-sensitive parameters, or at least one of the parameters belonging to the group of temperature-sensitive parameters, some time after start of a read operation or write operation. In the case of prolonged duration of such read operation or write operation, it is desirable that such recalibration procedure is repeated regularly.

As mentioned before, recalibration processes are known per se, and the present invention is not directed to improving a recalibration process as such. In fact, known per se recalibration processes may be applied when implementing the present invention; therefore, recalibration processes as such will not be explained in further detail here. The present invention relates specifically to the timing of the recalibration processes. According to an important aspect of the present invention, a recalibration process is initiated on the basis of an amount of time lapsed since the previous calibration or recalibration.

Thus, it may be that the time intervals between successive recalibration processes are constant. However, according to a further important aspect of the present invention, the successive recalibration processes are preferably performed with a decreasing repetition frequency, or increasing interval between successive recalibration processes. Immediately after start of a read procedure or write procedure, the change in laser temperature will be larger than in a later stage, so that the need of recalibration diminishes with time.

Figure 3A:
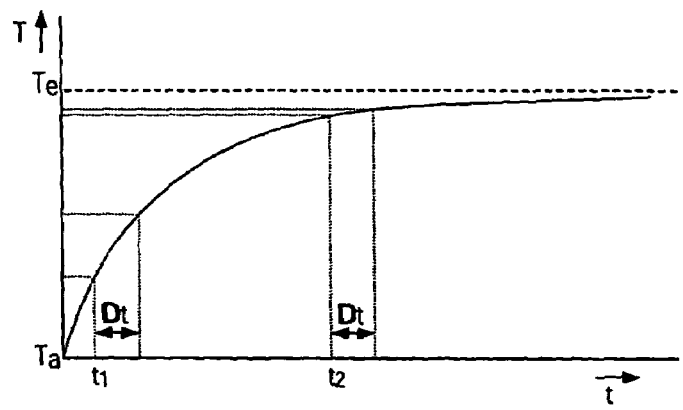
FIGS. 3A-3C are graphs illustrating the development of temperature as a function of time.

FIG. 3A is a graph illustrating generally the development of temperature T at a certain location within the housing of the disc drive 1, as a function of time t. For instance, the graph of FIG. 3A is illustrative for the temperature rise of the laser device. It is assumed that the disc drive 1 has been switched off for some time, so that at time t=0, when a read procedure or write procedure is started, the temperature T is equal to ambient temperature Ta. After time t=0, the temperature rises quickly, but the temperature rising speed (derivative dT/dt) decreases, and eventually the temperature approaches a new equilibrium temperature Te. It is easily seen that the temperature rise within an early time interval [t1, t1 +Δt] is larger than the temperature rise within a later time interval [t2, t2+Δt] of same duration. Thus, it is expected that a temperature-sensitive parameter (such as for instance optimal laser power) will change more during such early time interval than during such later time interval, so that fewer recalibration processes are sufficient during the later time interval as compared with the early time interval.

It is noted that the development of ambient temperature within the disc drive housing, causing changes in the focus offset, has a similar shape as the curve of FIG. 3A but at a larger time scale.

Thus, the lapse of a certain amount of time since a particular event is considered to be an indication that it would be desirable to execute a recalibration process. The moment in time when such recalibration process becomes desirable will be indicated as recalibration due time $t_D$.

Figure 3B:
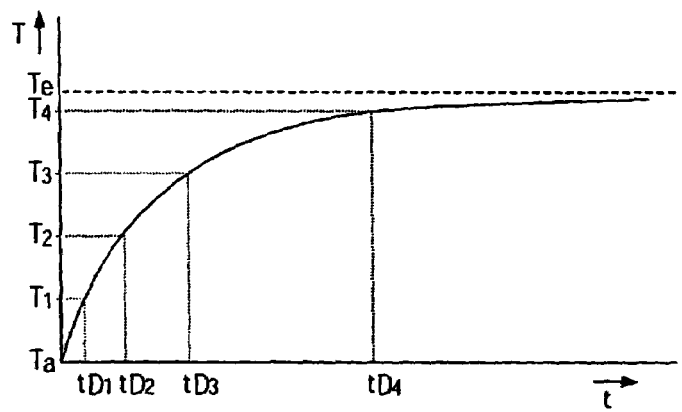

FIG. 3B is a graph comparable to FIG. 3A, now illustrating successive calibration due times $t_D1, t_D2, t_D3, \ldots$ selected in accordance with the present invention. It is clearly shown that the time interval ($t_D4-t_D3$) between later calibration due times $t_D3$ and $t_D4$ is larger than the time interval $(t_D2-t_D1)$ between early calibration due times $t_D1$ and $t_D2$. In the following, time intervals between successive calibration due times $t_Di$ and $t_D(i-1)$ will be indicated as $\Delta t_Di$.

Figure 3C:
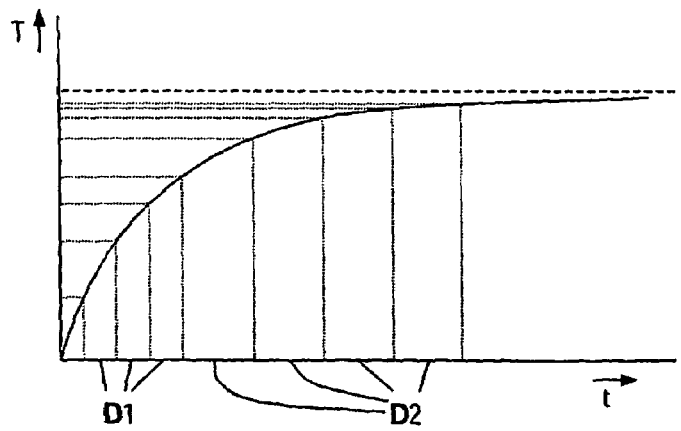

In one exemplary implementation of the present invention, the time intervals $\Delta t_Di$ have a first constant value $\Delta 1$ for a first number of successive calibration due times and have a second, larger constant value $\Delta 2$ for a second number of successive calibration due times following the first number of successive calibration due times, as illustrated in FIG. 3C. After that, a third number of successive calibration due times can have time intervals $\Delta t_Di$ having a third constant value larger than the second constant value, etc.

In another exemplary implementation of the present invention, the time intervals $\Delta t_Di$ are selected such that the corresponding absolute temperature changes $Ti-(T(i-1))$ are substantially constant, as illustrated in FIG. 3B. In FIG. 3B, the temperatures at times $t_Di$ are indicated at Ti. It is clearly seen in FIG. 3B that T4−T3 is approximately equal to T2−T1.

In yet another exemplary implementation of the present invention, the time intervals $\Delta t_Di$ are selected such that the corresponding relative temperature changes $\{Ti-(T(i-1))\}/T(i-1)$ are substantially constant. Then, $(T4-T3)/T3$ would be approximately equal to $(T2-T1)/T1$, but this is not illustrated in the figures.

It is possible that the calibration due times $t_Di$ are determined on the basis of a measurement of the actual temperature T. However, this would involve the use of a temperature sensor, which is not preferred. In a preferred embodiment, the controller 10 comprises a timer 40 for determining calibration due times $t_Di$. Such timer can be started at the said particular event. This particular event may be, for instance, the previous recalibration due time, or the start of the previous recalibration procedure, or the end of the previous recalibration procedure, i.e. when the previous actual calibration process has been completed.

In one implementation of the present invention, a recalibration process starts immediately at a recalibration due time. In such case, the recalibration due time is the same as the starting time of the recalibration process. Two examples of this implementation will be explained with reference to FIGS. 4A-B.

Figure 4A:
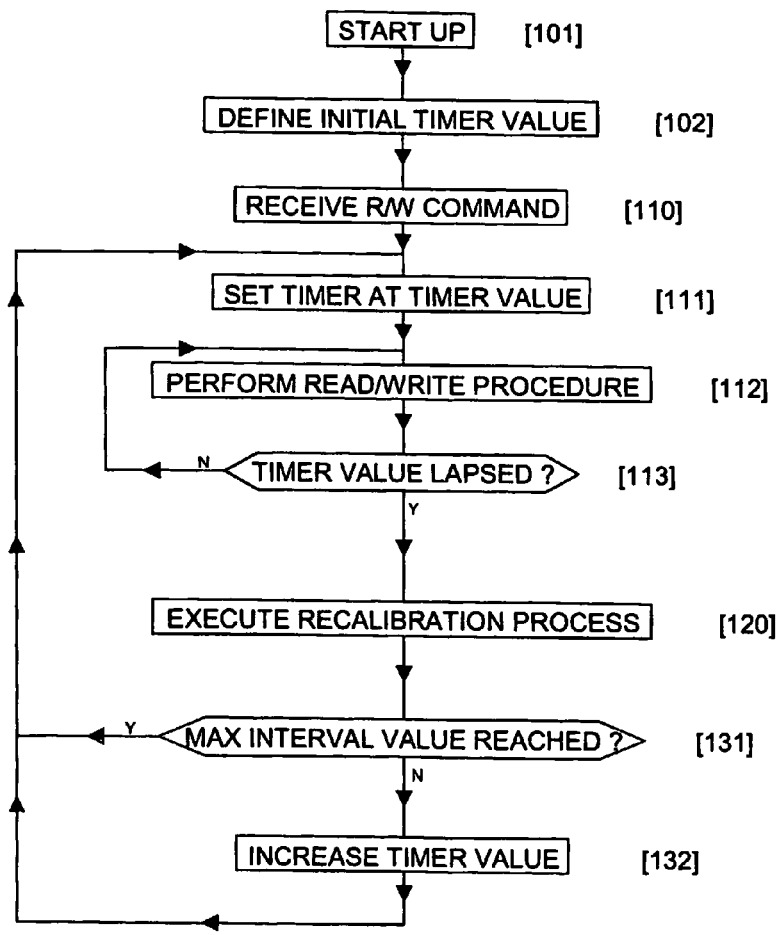
FIG. 4A is a flow diagram schematically illustrating a first method of determining recalibration starting times in accordance with the present invention.

FIG. 4A is a flow diagram schematically illustrating one method of determining recalibration due times in accordance with the present invention. After start-up [step 101], an initial timer value is defined [step 102]. When a read command or write command is received [step 110] at time t0, the timer 40 is set at this initial timer value [step 111], which determines the time interval $\Delta t_D1$ until the first recalibration due time $t_D1$. During the write/read procedure [step 112], the timer condition is monitored [step 113]. If the timer 40 has reached the timer value, it is determined that a recalibration due time has been reached, and a recalibration process is executed [step 120].

After completion of the recalibration process, the timer value is increased with a certain timer increment [step 132], and the process is repeated, indicated as a jump back to step 111.

Thus, in this embodiment, the particular event for starting the timer for calculating the next recalibration due time is the end of the previous recalibration procedure.

When increasing the timer value in step 132, the timer increment may always have the same value, but it is also possible that an expected temperature development characteristic like the graph of FIGS. 3A-B is taken into account and the timer increment increases, such that successive absolute or relative temperature changes between successive recalibration initiation times are substantially constant, as explained above.

It is also possible that the timer value is only increased up to a predefined maximum value, as illustrated by step 131 before step 132 in FIG. 4A.

FIG. 5A is a timing graph, schematically showing the timing of this example. At time $t_D(i-1)$, indicated at (a), a recalibration process starts. At completion of this recalibration process, indicated at (b), the read or write process continues, and the new timer interval starts. At time $t_D(i)$, indicated at (c), the timer interval ends, and a next recalibration process starts.

Figure 4B:
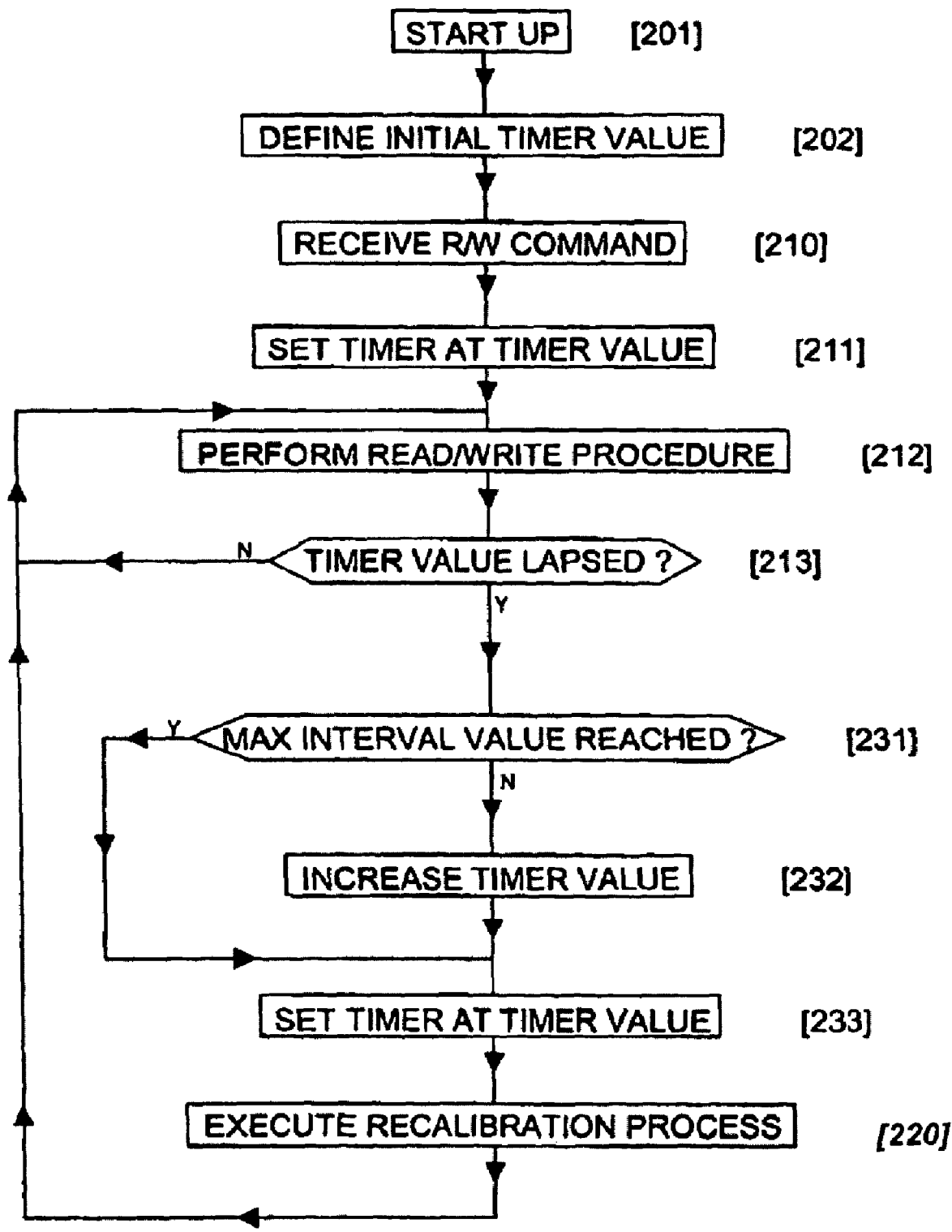
FIG. 4B is a flow diagram schematically illustrating a second method of determining recalibration starting times in accordance with the present invention.

FIG. 4B is a flow diagram schematically illustrating another method of determining recalibration due times in accordance with the present invention. After start-up [step 201], an initial timer value is defined [step 202]. When a read command or write command is received [step 210] at time to, the timer 40 is set at this initial timer value [step 211], which determines the time interval $\Delta t_D1$ until the first recalibration due time $t_D1$. During the write/read procedure [step 212], the timer condition is monitored [step 213]. If the timer 40 has reached the timer value, it is determined that a recalibration due time has been reached. Now, the timer value is increased with a certain timer increment [step 232], and the timer 40 is set at this timer value [step 233]. Then, a recalibration process is executed [step 220], after which the process is repeated, indicated as a jump back to step 212.

Thus, in this embodiment, the particular event for starting the timer for calculating the next recalibration due time is the previous recalibration due time.

When increasing the timer value in step 232, the timer increment may always have the same value, but it is also possible that an expected temperature development characteristic like the graph of FIGS. 3A-B is taken into account and the timer increment increases, such that successive absolute or relative temperature changes between successive recalibration initiation times are substantially constant, as explained above.

It is also possible that the timer value is only increased up to a predefined maximum value, as illustrated by step 231 before step 232 in FIG. 4B.

FIG. 5B is a timing graph, schematically showing the timing of this example. At time $t_D(i-1)$, indicated at (a), a recalibration process starts, and also the new timer interval starts. At completion of this recalibration process, indicated at (b), the read or write process continues. At time $t_D(i)$, indicated at (c), the timer interval ends, and a next recalibration process starts.

In another implementation of the present invention, a recalibration process does not necessarily start immediately at a recalibration due time. First, it is checked whether the read/write process should be continued and the recalibration process should be postponed until a more suitable moment. In such case, the recalibration due time marks the beginning of a check for recalibration permission conditions, while the actual recalibration process only starts when all recalibration permission conditions are fulfilled. It may even be that the actual recalibration process does not start at all, because at least one of the recalibration permission conditions is not fulfilled.

By way of example of a recalibration permission condition, it may be that the disc drive is currently writing data from a data buffer (in a writing mode), and that the flow of data may not be disturbed until the buffer is empty. Or, it may be that, in a reading mode, the disc drive is outputting data to the host from a buffer which is almost empty and which should first be filled again in order to assure an undisturbed flow of data to the host.

Three examples of this implementation will be explained with reference to FIGS. 6A-C.

Figure 6A:
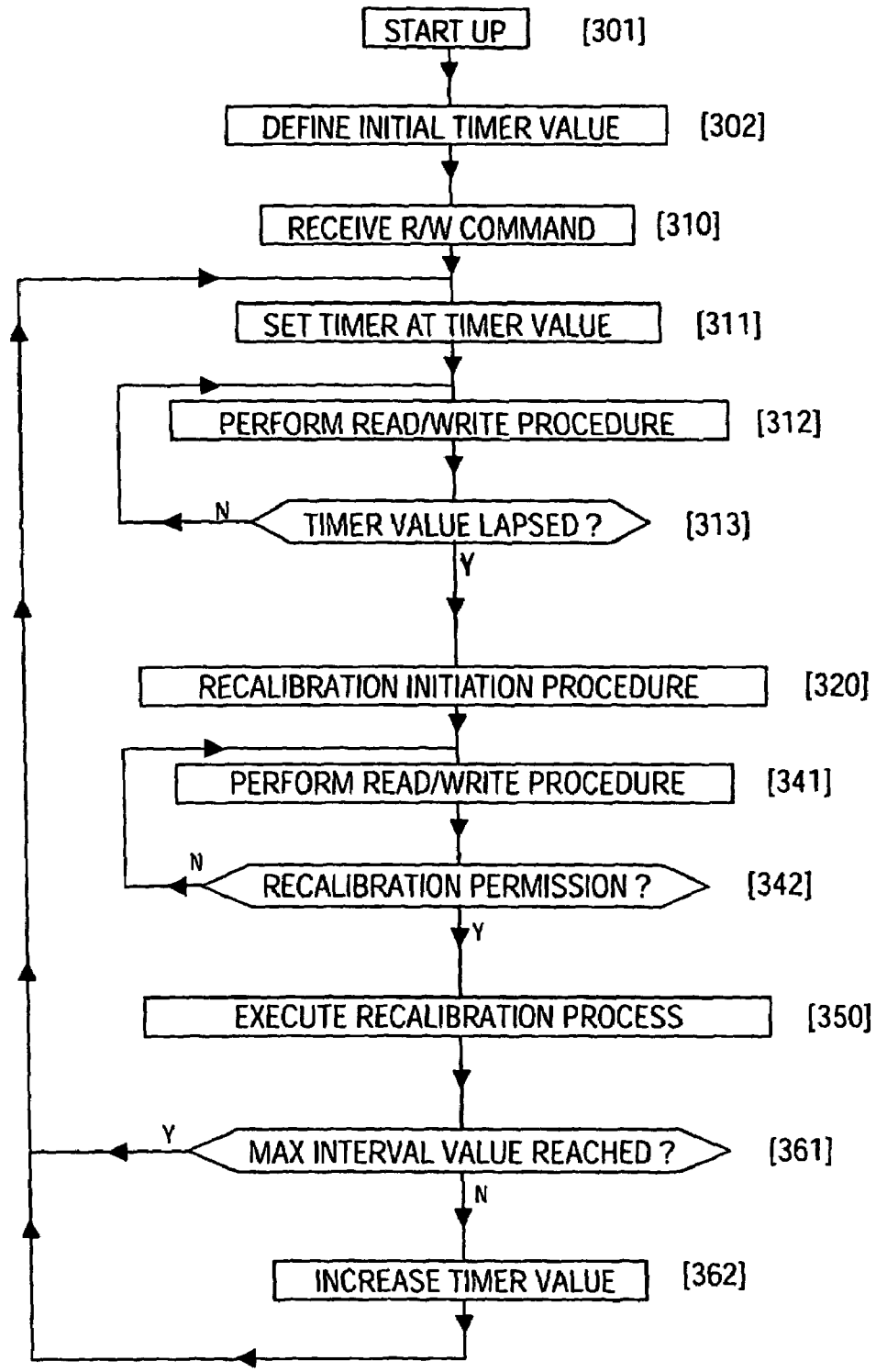
FIG. 6A is a flow diagram schematically illustrating a third method of determining recalibration starting times in accordance with the present invention.

FIG. 6A is a flow diagram schematically illustrating one method of determining recalibration due times in accordance with the present invention. After start-up [step 301], an initial timer value is defined [step 302]. When a read command or write command is received [step 310] at time t0, the timer 40 is set at this initial timer value [step 311], which determines the time interval $\Delta t_D 1$ until the first recalibration due time $t_D 1$. During the write/read procedure [step 312], the timer condition is monitored [step 313]. If the timer 40 has reached the timer value, it is determined that a recalibration due time has been reached, and a recalibration initiation procedure is executed [step 320].

After this recalibration initiation procedure, the write/read procedure continues [step 341], during which the recalibration permission conditions are checked [step 342]. Only when all recalibration permission conditions are fulfilled, a recalibration process is executed [step 350]. Thus, the actual start of the recalibration process is later than the corresponding recalibration due time.

After completion of the recalibration process, the timer value is increased with a certain timer increment [step 362], and the process is repeated, indicated as a jump back to step 311.

Thus, in this embodiment, the particular event for starting the timer for calculating the next recalibration due time is the end of the previous recalibration procedure.

When increasing the timer value in step 362, the timer increment may always have the same value, but it is also possible that an expected temperature development characteristic like the graph of FIGS. 3A-B is taken into account and the timer increment increases, such that successive absolute or relative temperature changes between successive recalibration initiation times are substantially constant, as explained above.

It is also possible that the timer value is only increased up to a predefined maximum value, as illustrated by step 361 before step 362 in FIG. 6A.

Figure 7A:
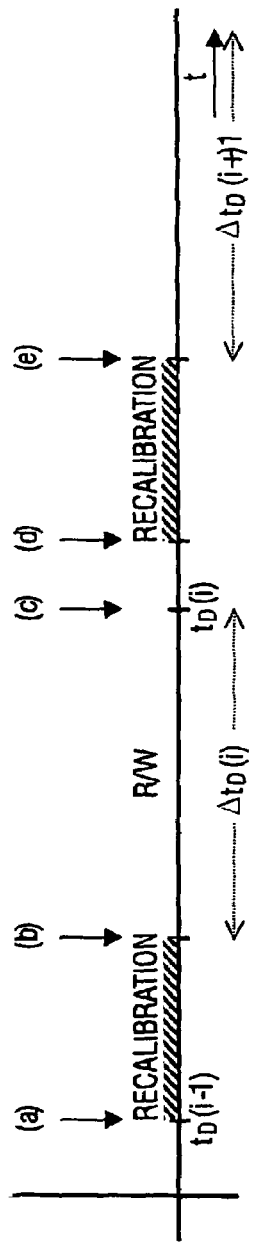
FIGS. 7A-C are graphs illustrating the timing of the methods illustrated in FIGS. 6A-C, respectively.

FIG. 7A is a timing graph, schematically showing the timing of this example. At time $t_D(i-1)$, indicated at (a), a recalibration process starts. At completion of this recalibration process, indicated at (b), the read or write process continues, and the new timer interval starts. At time $t_D(i)$, indicated at (c), the timer interval ends, but the read or write process continues until such time when all recalibration permission conditions are fulfilled, indicated at (d), at which moment a next recalibration process starts.

Figure 6B:
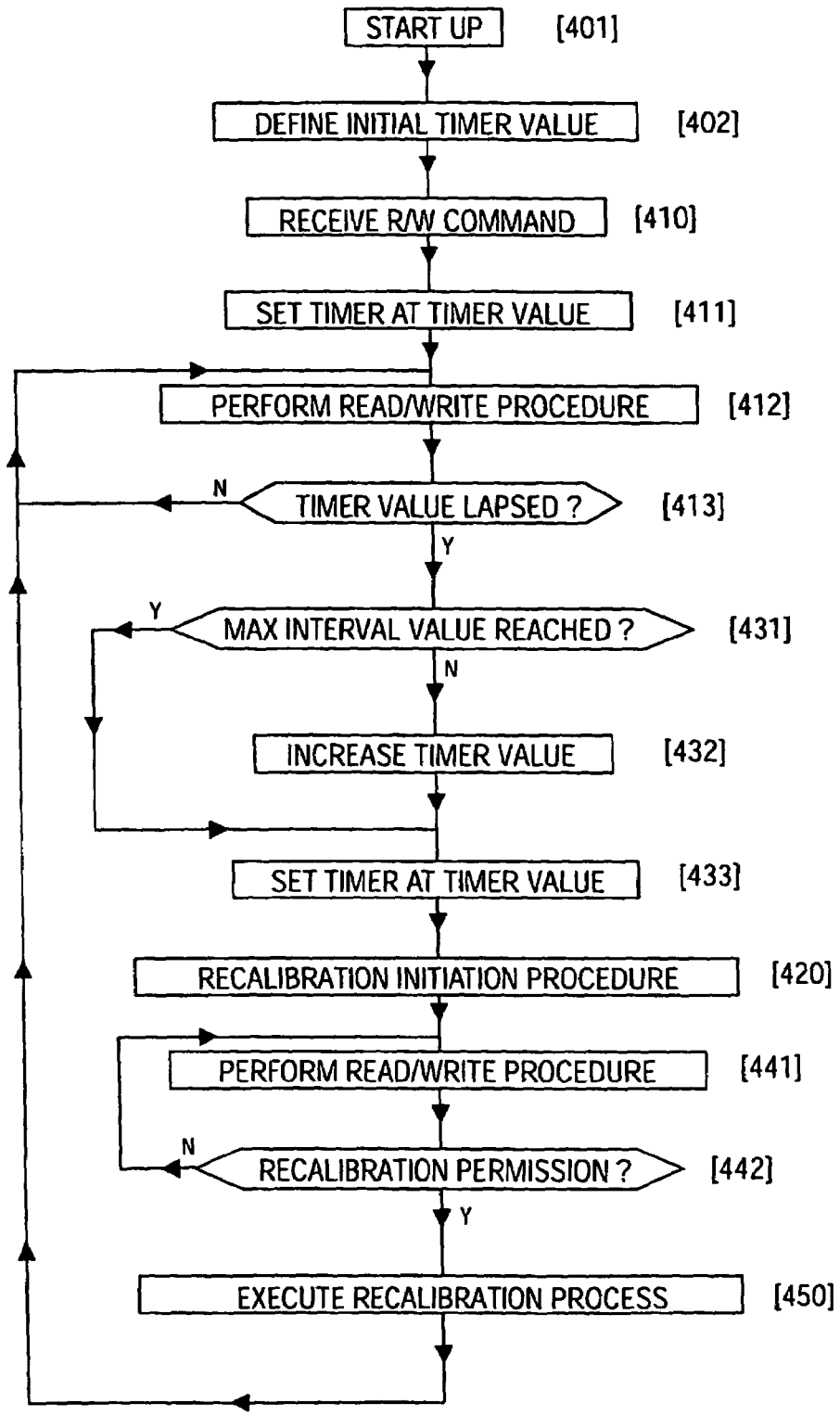
FIG. 6B is a flow diagram schematically illustrating a fourth method of to determining recalibration starting times in accordance with the present invention.

FIG. 6B is a flow diagram schematically illustrating another method of determining calibration due times in accordance with the present invention. After start-up [step 401], an initial timer value is defined [step 402]. When a read command or write command is received [step 410] at time t0, the timer 40 is set at this initial timer value [step 411], which determines the time interval $\Delta t_D 1$ until the first recalibration due time $t_D 1$. During the write/read procedure [step 412], the timer condition is monitored [step 413]. If the timer 40 has reached the timer value, it is determined that a recalibration due time has been reached. Now, the timer value is increased with a certain timer increment [step 432], and the timer 40 is set at this timer value [step 433]. Then, a recalibration initiation procedure is executed [step 420].

After this recalibration initiation procedure, the write/read procedure continues [step 441], during which the recalibration permission conditions are checked [step 442]. Only when all recalibration permission conditions are fulfilled, a recalibration process is executed [step 450]. Thus, the actual start of the recalibration process is later than the corresponding recalibration due time.

After completion of the recalibration process, the process is repeated, indicated as a jump back to step 412.

Thus, in this embodiment, the particular event for starting the timer for calculating the next recalibration due time is the previous recalibration due time.

When increasing the timer value in step 432, the timer increment may always have the same value, but it is also possible that an expected temperature development characteristic like the graph of FIGS. 3A-B is taken into account and the timer increment increases, such that successive absolute or relative temperature changes between successive recalibration initiation times are substantially constant, as explained above.

It is also possible that the timer value is only increased up to a predefined maximum value, as illustrated by step 431 before step 432 in FIG. 6B.

Figure 7B:
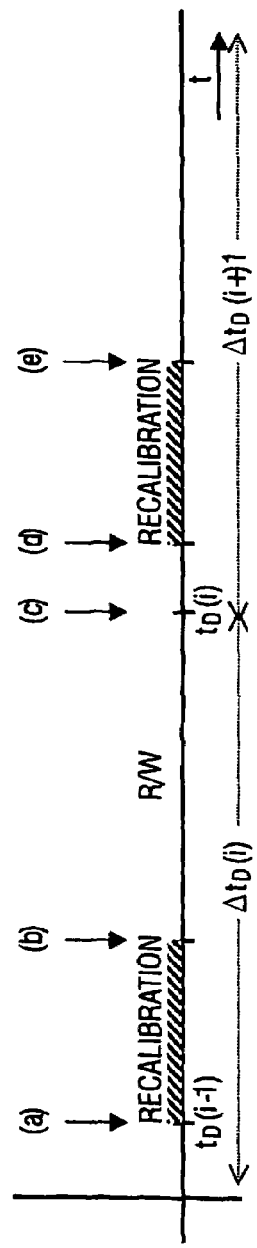

FIG. 7B is a timing graph, schematically showing the timing of this example. At time $t_D(i-1)$, indicated at (a), a recalibration process starts. At completion of this recalibration process, indicated at (b), the read or write process continues. At time $t_D(i)$, indicated at (c), the timer interval ends, and the new timer interval starts, but the read or write process continues until such time when all recalibration permission conditions are fulfilled, indicated at (d), at which moment a next recalibration process starts.

Figure 6C:
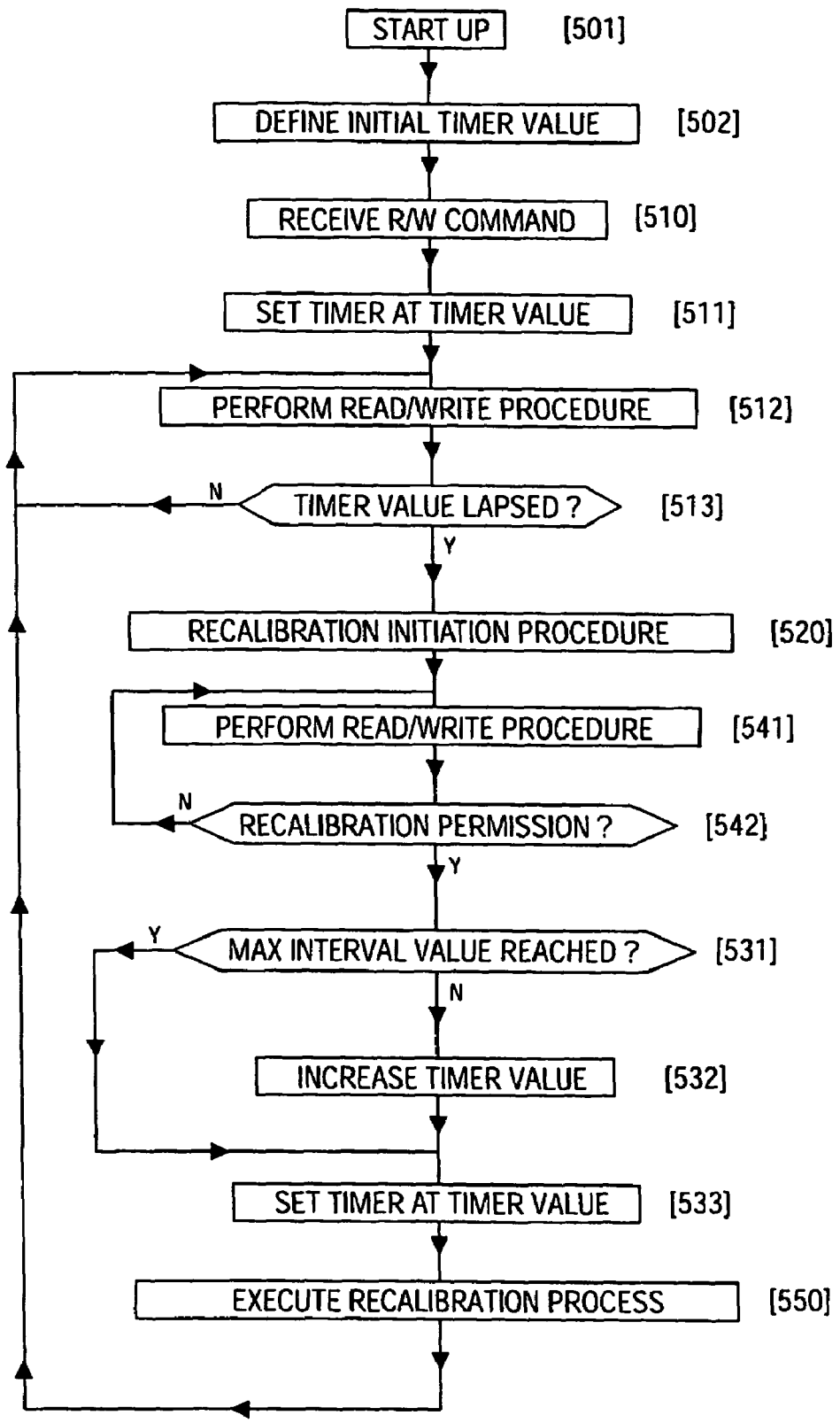
FIG. 6C is a flow diagram schematically illustrating a fifth method of determining recalibration starting times in accordance with the present invention.

FIG. 6C is a flow diagram schematically illustrating yet another method of determining calibration due times in accordance with the present invention. After start-up [step 501], an initial timer value is defined [step 502]. When a read command or write command is received [step 510] at time t0, the timer 40 is set at this initial timer value [step 511], which determines the time interval $\Delta t_D 1$ until the first recalibration due time $t_D 1$. During the write/read procedure [step 512], the timer condition is monitored [step 513]. If the timer 40 has reached the timer value, it is determined that a recalibration due time has been reached, and a recalibration initiation procedure is executed [step 520].

After this recalibration initiation procedure, the write/read procedure continues [step 541], during which the recalibration permission conditions are checked [step 542]. Only when all recalibration permission conditions are fulfilled, the timer value is increased with a certain timer increment [step 532], the timer 40 is set at this timer value [step 533], and a recalibration process is executed [step 550]. Thus, the actual start of the recalibration process is later than the corresponding recalibration due time.

After completion of the recalibration process, the process is repeated, indicated as a jump back to step 512.

Thus, in this embodiment, the particular event for starting the timer for calculating the next recalibration due time is the actual start of the previous recalibration process.

When increasing the timer value in step 532, the timer increment may always have the same value, but it is also possible that an expected temperature development characteristic like the graph of FIGS. 3A-B is taken into account and the timer increment increases, such that successive absolute or relative temperature changes between successive recalibration initiation times are substantially constant, as explained above.

It is also possible that the timer value is only increased up to a predefined maximum value, as illustrated by step 531 before step 532 in FIG. 6C.

Figure 7C:
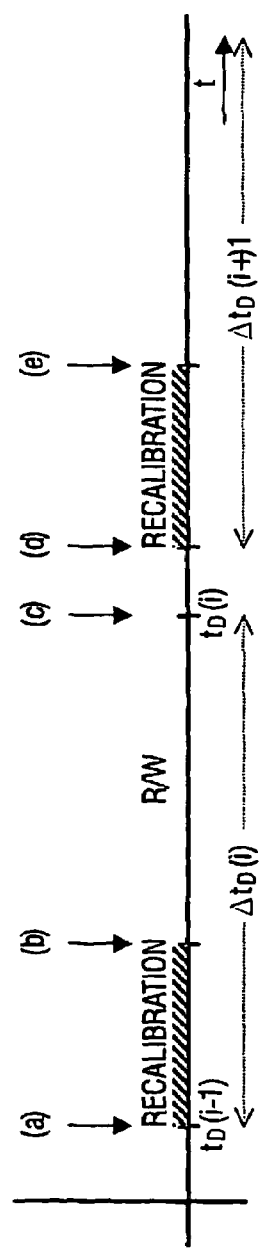

FIG. 7C is a timing graph, schematically showing the timing of this example. At time $t_D(i-1)$, indicated at (a), a recalibration process staffs. At completion of this recalibration process, indicated at (b), the read or write process continues. At time $t_D(i)$, indicated at (c), the timer interval ends, but the read or write process continues until such time when all recalibration permission conditions are fulfilled, indicated at (d), at which moment a next recalibration process starts and the new timer interval starts.

In the recalibration process mentioned above, i.e. the steps 120, 220, 350, 450, or 550 of the above-described examples, at least one temperature-sensitive parameter is calibrated. In fact, it is possible that for each individual temperature-sensitive parameter an individual timing procedure is executed. However, it is preferred that in the recalibration process all temperature-sensitive parameters are calibrated. It is even more preferred that in the recalibration process all calibrateable parameters are calibrated, i.e. that the same calibrations are performed as during the start-up procedure.

Figure 2:
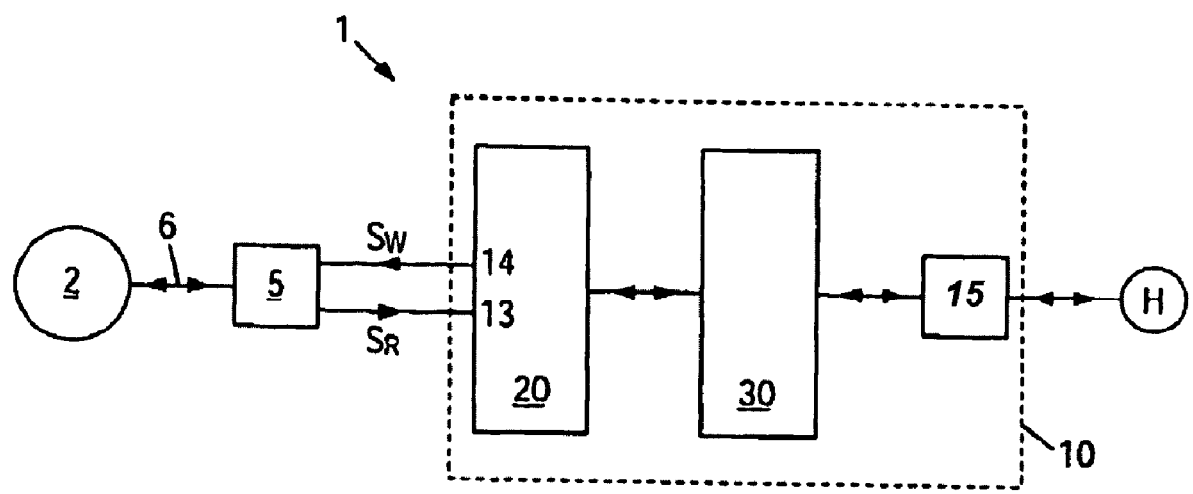
FIG. 2 schematically shows a block diagram illustrating relevant parts of a control circuit.

FIG. 2 schematically shows a diagram which illustrates a possible embodiment of the control circuit 10 in somewhat more detail. Specifically, in this embodiment, the control circuit 10 comprises a data engine system 20 and a data processing system 30. The data engine system 20, hereinafter simply indicated as "engine", provides an interface between disc drive apparatus and disc, as it handles all incoming and outgoing communication between disc drive 1 and disc 2.

The data processing system 30, hereinafter simply indicated as "processor", processes the data present in incoming and outgoing signals $S_R$ and $S_W$ from and to the disc, respectively, and processes the data for communication to and from a host system such as a PC, respectively.

In such design, the recalibration initiation procedure (i.e. steps 320, 420 or 520 in the above examples) and the recalibration process (i.e. steps 120, 220, 350, 450, or 550 in the above examples) may be executed by the data engine system 20, whereas the recalibration permission conditions are handled by the processor 30. The recalibration initiation procedure may comprise a step of the engine 20 sending a recalibration request signal to the processor 30. When the processor 30 finds that all recalibration permission conditions are fulfilled, it may send a recalibration permission signal to the engine 20, which, upon receiving this recalibration permission signal, will enter a calibration mode (i.e. steps 350, 450, or 550 in the above examples).

It should be clear to a person skilled in the art that the present invention is not limited to the exemplary embodiments discussed above, but that various variations and modifications are possible within the protective scope of the invention as defined in the appending claims.

For instance, the present invention has been explained in the context of optical storage discs. However, the gist of the present invention is not restricted to optical storage discs, but is generally applicable to storage devices in general.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, etc.

The invention claimed is:

1. Method for timing multiple recalibration processes in a storage write/read apparatus (1) when writing/reading information into/from a storage medium (2), wherein the recalibration processes are executed in dependence upon an amount of time lapsed from a previous event wherein the recalibration processes are executed more frequently during an early phase of the write/read operation than during a later phase of the write/read operation.

2. Method according to claim 1, wherein the time interval between successive recalibration processes measured from said previous event, increases during the course of the write/read operation.

3. Method according to claim 1, wherein at least one temperature-sensitive parameter is recalibrated in the recalibration processes.

4. Method according to claim 1, wherein some parameters are calibrated during a start-up phase, and wherein the same parameters are also recalibrated in the recalibration processes.

5. Method according to claim 1, the method comprising the step of calculating a recalibration due time $(t_D(i))$ on the basis of a time interval $(\Delta t_D(j))$ which starts at a particular event.

6. Method according to claim 5, wherein recalibration due times $(t_D(i))$ are calculated such that expected absolute or relative increments of a temperature at a certain location within the disc drive apparatus in the time intervals between successive recalibration due times are substantially constant.

7. Method according to claim 5, wherein the time intervals between successive recalibration due times have a first constant value during a first phase of the write/read operation, and have a second constant value during a second phase of the write/read operation, the second constant value being larger than the first constant value.

8. Method according to claim 5, wherein the time intervals between successive recalibration due times increase up to a predetermined maximum value.

9. Method according to claim 5, wherein increment in duration of two successive time intervals between successive recalibration due times is always substantially constant.

10. Method according to claim 5, wherein a recalibration process is started substantially immediately at a recalibration due time $(t_D D(i))$.

11. Method according to claim 10, wherein said particular event substantially coincides with a previous recalibration due time $(t_D(i-1))$.

12. Method according to claim 10, wherein said particular event substantially coincides with the end of a previous recalibration process.

13. Method according to claim 5, wherein, at a recalibration due time $(t_D(i))$, a check is made regarding predetermined recalibration permission conditions, and the start of an actual recalibration process is postponed until such time when all said predetermined recalibration permission conditions are fulfilled.

14. Method according to claim 13, wherein the write/read operation is continued until the start of an actual recalibration process.

15. Method according to claim 13, wherein said particular event substantially coincides with a previous recalibration due time $(t_D(i-1))$.

16. Method according to claim 13, wherein said particular event substantially coincides with the end of a previous recalibration process.

17. Method according to claim 13, wherein said particular event substantially coincides with the actual start of a previous recalibration process.

18. Storage write/read apparatus (1) for writing/reading information into/from a storage medium (2), the apparatus being designed for performing the method according to claim 1.

19. Storage write/read apparatus (1) according to claim 18, the apparatus being a disc drive apparatus for writing/reading information into/from a storage disc (2), for instance an optical storage disc.

20. Storage write/read apparatus (1) for writing/reading information into/from a storage medium (2), the apparatus being designed for performing the method according to claim 13, the apparatus comprising a control circuit (10) designed to perform multiple recalibration processes during a write or read process; the apparatus comprising a data engine system (20) and a data processing system (30) in data communication with each other; wherein the data engine system is designed, in a reading mode, for receiving read signals (SR), deriving data signals from the read signals, and communicating the data signals to the data processing system, and in a writing mode, for receiving data signals from the data processing system and generating write signals (SW); wherein the data processing system is designed, in a reading mode, for receiving data signals from the data engine system and processing the data for communication to a host system (H), and in a writing mode, for communication with a host system, processing data signals in the communication signals received from the host system, and communicating data signals to the data engine system; wherein the data engine system is designed for calculating the recalibration due times, and wherein the data processing system is designed for determining the recalibration permission conditions.

21. Method according to claim 1, wherein the previous event is a previous calibration or recalibration due time.

22. Method according to claim 1, wherein the previous event is a start of a previous calibration or recalibration.

23. Method according to claim 1, wherein the previous event is a completion of a previous calibration or recalibration.

24. Method for timing multiple recalibration processes in a storage write/read apparatus (1) when writing/reading information into/from a storage medium (2), wherein the recalibration processes are executed in dependence upon an amount of time calculated from a previous calibration or recalibration wherein the recalibration processes are executed more frequently during an early phase of the write/read operation than during a later phase of the write/read operation, the method comprising the step of calculating a recalibration due time ($t_D(i)$) on the basis of a time interval ($\Delta t_D(i)$) which starts at a particular event, wherein recalibration due times ($t_D(i)$) are calculated such that expected absolute or relative increments of a temperature at a certain location within the disc drive apparatus in the time intervals between successive recalibration due times are substantially constant.

25. Method for timing multiple recalibration processes in a storage write/read apparatus (1) when writing/reading information into/from a storage medium (2), wherein the recalibration processes are executed in dependence upon an amount of time calculated from a previous calibration or recalibration wherein the recalibration processes are executed more frequently during an early phase of the write/read operation than during a later phase of the write/read operation, the method comprising the step of calculating a recalibration due time ($t_D(i)$) on the basis of a time interval ($\Delta_D(i)$) which starts at a particular event, wherein said particular event substantially coincides with a previous recalibration due time ($t_D(i-1)$), and wherein a recalibration process is started substantially immediately at a recalibration due time ($t_DD(i)$).

26. Method for timing multiple recalibration processes in a storage write/read apparatus (1) when writing/reading information into/from a storage medium (2), wherein the recalibration processes are executed in dependence upon an amount of time calculated from a previous calibration or recalibration wherein the recalibration processes are executed more frequently during an early phase of the write/read operation than during a later phase of the write/read operation, the method comprising the step of calculating a recalibration due time ($t_D(i)$) on the basis of a time interval ($\Delta t_D(i)$) which starts at a particular event, wherein said particular event substantially coincides with the end of a previous recalibration process, and wherein a recalibration process is started substantially immediately at a recalibration due time ($t_DD(i)$).

27. Method for timing multiple recalibration processes in a storage write/read apparatus (1) when writing/reading information into/from a storage medium (2), wherein the recalibration processes are executed in dependence upon an amount of time calculated from a previous calibration or recalibration wherein the recalibration processes are executed more frequently during an early phase of the write/read operation than during a later phase of the write/read operation, the method comprising the step of calculating a recalibration due time ($t_D(i)$) on the basis of a time interval ($\Delta t_D(i)$) which staffs at a particular event, wherein said particular event substantially coincides with the end of a previous recalibration process, and wherein, at a recalibration due time ($t_D(i)$), a check is made regarding predetermined recalibration permission conditions, and the start of an actual recalibration process is postponed until such time when all said predetermined recalibration permission conditions are fulfilled.

28. Method according to claim 27, wherein the write/read operation is continued until the start of an actual recalibration process.

29. Method according to claim 27, wherein said particular event substantially coincides with a previous recalibration due time ($t_D(i-1)$).

30. Method according to claim 27, wherein said particular event substantially coincides with the end of a previous recalibration process.

31. Method according to claim 27, wherein said particular event substantially coincides with the actual start of a previous recalibration process.

32. Storage write/read apparatus (1) for writing/reading information into/from a storage medium (2), the apparatus being designed for performing the method according to claim 27, the apparatus comprising a control circuit (10) designed to perform multiple recalibration processes during a write or read process; the apparatus comprising a data engine system (20) and a data processing system (30) in data communication with each other; wherein the data engine system is designed, in a reading mode, for receiving read signals (SR), deriving data signals from the read signals, and communicating the data signals to the data processing system, and in a writing mode, for receiving data signals from the data processing system and generating write signals (SW); wherein the data processing system is designed, in a reading mode, for receiving data signals from the data engine system and processing the data for communication to a host system (H), and in a writing mode, for communication with a host system, processing data signals in the communication signals received from the host system, and communicating data signals to the data engine system; wherein the data engine system is designed for calculating the recalibration due times, and wherein the data processing system is designed for determining the recalibration permission conditions.

\* \* \* \* \*